Aug. 13, 1935. M. POPPER Re. 19,667

PINKING ATTACHMENT FOR SEWING MACHINES

Original Filed Feb. 19, 1932 2 Sheets-Sheet 1

INVENTOR
Max Popper
BY Joseph Blacker
ATTORNEY

PINKING ATTACHMENT FOR SEWING MACHINES

Original Filed Feb. 19, 1932 2 Sheets-Sheet 2

INVENTOR
Max Popper
BY Joseph Blacker
ATTORNEY

Reissued Aug. 13, 1935

Re. 19,667

UNITED STATES PATENT OFFICE 19,667

PINKING ATTACHMENT FOR SEWING MACHINES

Max Popper, Brooklyn, N. Y., assignor to Lewis Invisible Stitch Machine Company, St. Louis, Mo., a corporation of Maine Original No. 1,886,422, dated November 8, 1932, Serial No. 594,015, February 19, 1932. Application for reissue November 2, 1934, Serial No. 751,154

8 Claims. (Cl. 112—122)

This invention relates to an improved pinking attachment for sewing machines and the main object of the invention is to provide an attachment which can be readily applied to any sewing machine and by means of which the edges of the fabric being sewed will at the same time be pinked and be given an ornamental appearance.

Another object of this invention is to provide a pinking attachment which can be rigidly attached to the base-plate of a sewing machine and be actuated by the driving mechanism of the sewing machine and thus convert any standard sewing machine into a combined stitching and pinking machine which will sew and pink in one operation.

Another object of this invention is to provide a pinking attachment having a base, the lower surface of which is planed and mounted in the same plane as the cloth plate of a sewing machine and the said pinking attachment comprising a set of male and female cutting members, the female member being fastened to the said lower surface of the base.

Another object of this invention is to provide resilient means for exerting a frictional pressure between the cutting edges of the male and female cutting members, thereby adapting my pinking attachment for operating on all kinds of fabrics and on fabrics of various thicknesses.

Another object of this invention is to cut away a portion of the cloth plate so as to provide two parallel longitudinal guide arms forming a keyway facing the pinking attachement and to adapt the width of the female cutting member to function as a key for sliding engagement with said guide arms or keyway and thus permit the complete attachment to be shifted longitudinally and to vary the distance between the stitch line and the ornamented edge of the fabric.

Another object of this invention is to provide a longitudinally adjustable guide member attached to the base of the pinking attachment for gauging and guiding the edge of the fabric so as to secure the desired spacing of the pinked edge from the stitch line, the said guide member insuring the seam or line of stitching being parallel with the edge of the material being pinked.

Another object of this invention is to provide a pinking attachment having a base rigidly attached to the base-plate of a sewing machine and having a cutter arm pivotally mounted on said pinking attachment base and adapted to be rocked or swung in and out of engagement with a mating cutter member fastened to said base, the said arm having a roller mounted at its upper portion and in right-angular relation thereto and in rolling contact with an eccentrically mounted roller rotatably actuated by the driving mechanism of the sewing machine.

Another object of this invention is to mount the cutter arm roller in a frame which is pivotally mounted on the cutter arm and in right-angular relation thereto, and adapted to be swung upwardly into rolling contact or downwardly out of contact with the eccentrically mounted roller.

With the above and other objects in view the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

In the illustrated embodiment of the invention the numeral 10 indicates my pinking attachment, comprising a base 11, having upwardly extending arms, 12, 12, at one end and adapted to form guide means for a cutter arm 13, pivotally mounted on a shaft 14, extending through said arms.

Figure 3:
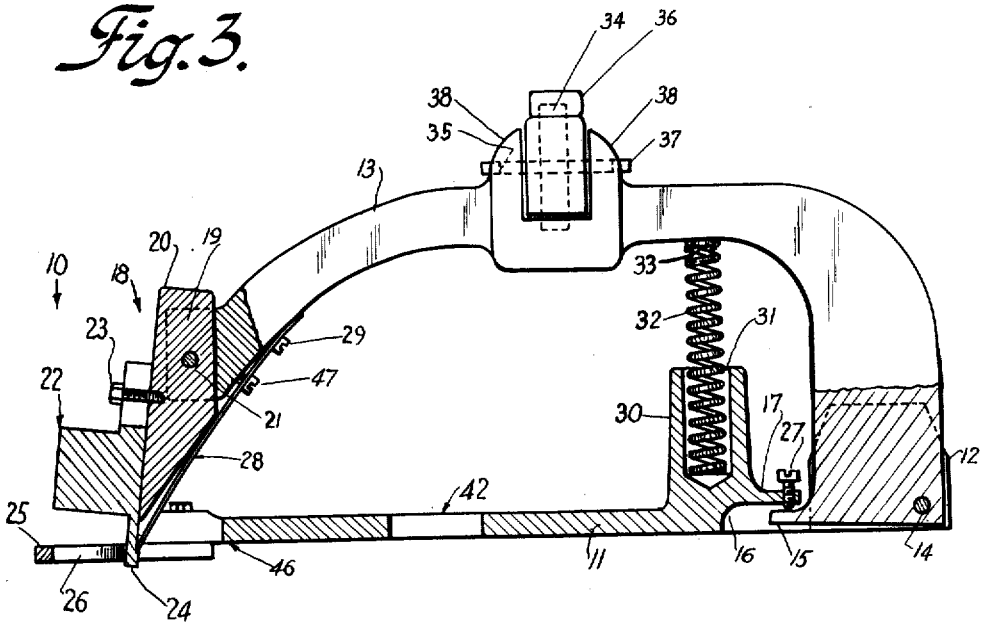
Figure 3 is a longitudinal section of the attachment, the section being taken as on line 3—3 in Figure 4.

As best shown in Figure 3, the cutter arm 13 has been provided at its lower end adjacent the shaft 14 with an angularly extending arm 15, adapted to enter a recess 16, in the base 11, and abut against an upper extension 17 of the base, and thus limiting the upward swing of the cutter arm 13, to a predetermined maximum swing.

At the free end 18 of the cutter arm 13, there has been provided two arms 19, 19, adapted to form guide means for a bar 20, pivotally mounted on a pin 21, extending through said arms.

A male cutting member 22, preferably triangular in form, is fastened to the bar 20 by means of a bolt 23, and has a downward extension 24, constantly in engagement with a female cutting member or ledger blade means 25, fastened to the lower surface of the base 11, and having a triangular aperture 26, adapted to receive the male cutting member 22. The bolt 23 also serves for raising and lowering the male cutting member 22 and adjusting it after being ground for wear. The extension 24 on the male cutting member 22 serves to maintain the male and female cutting members in alignment.

An adjusting screw 27 has been provided in the extension 17 of the base 11, and can be screwed down against the angularly extending arm 15, and serves to adjust the upward swing of the cutter arm 13, and thus maintaining the cutting edges of the male and female cutting members in proper operating relation.

A ribbon-like leaf spring 28 has been fastened to the cutter arm 13 by means of a screw 29, and extends angularly against the male cutting member 22, and serves to swing said member outwardly about the pin 21 into forced engagement with the female cutting member 25. A screw 47 has also been provided for adjusting the tension of the spring 28 and serves as means for regulating the frictional pressure required for cutting fabrics of various thicknesses.

As best shown in Figure 3, there has been provided a housing 30, integral with the base 11, and having an aperture 31 for an open coil spring 32, the upper end of the spring being in engagement with a pin 33, extending downwardly from the cutter arm 13. The spring 32 thus reacts against the base and against the cutter arm and serves to support the cutter arm 13 in a raised position and holds the cutting members out of cutting engagement.

Figure 2:
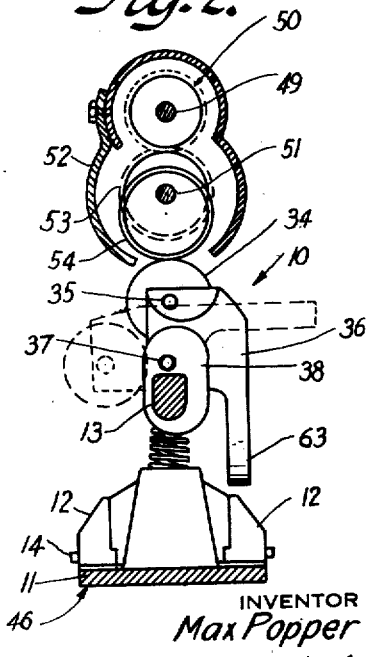
Figure 2 is a sectional view of the atttachment and shows a preferred means for actuating the cutter arm, the section being taken as on line 2—2 in Figure 1.

As best shown in Figure 2, the cutting arm 13 has been provided at its upper portion with a roller 34, mounted on a pin 35 in a frame 36, having a handle bar 63. The frame 36 is pivotally mounted on a pin 37 extending through arms 38, 38, at the upper portion of the cutter arm 13, and is adapted to be swung. It is thus possible to grasp the handle bar 63 and cause the roller 34 to swing upwardly into rolling contact or downwardly out of contact with an excentric roller 54 actuated by the driving mechanism of the sewing machine.

Figure 1:
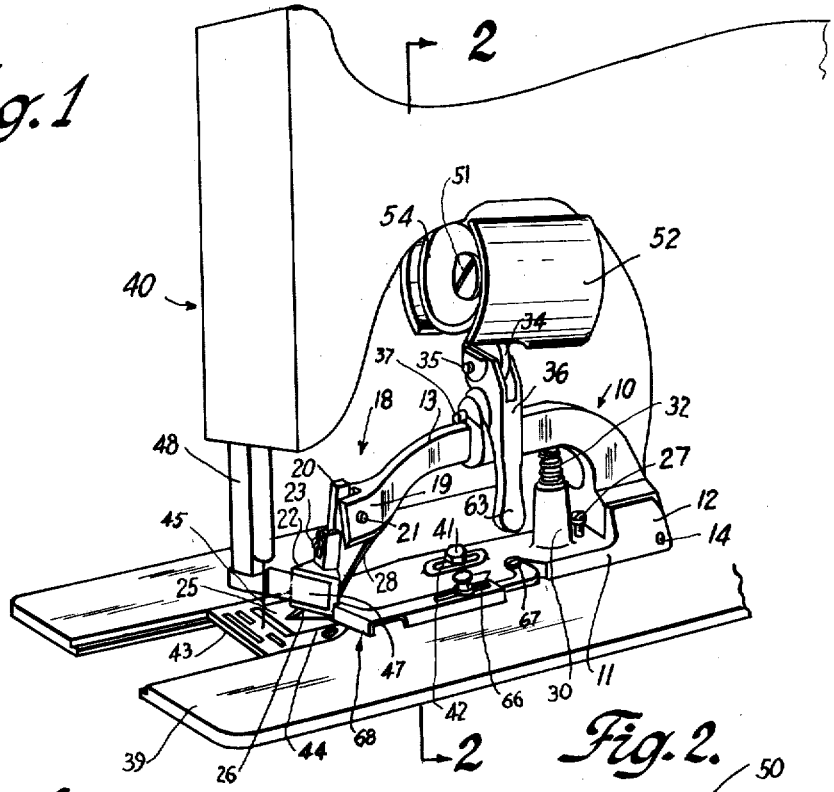
Figure 1 is a perspective view of the pinking attachment as applied to a sewing machine.
Figure 6:
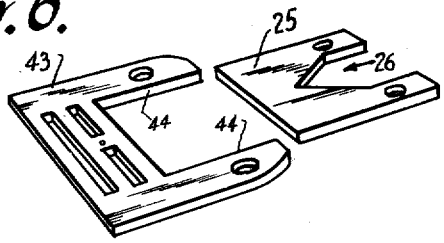
Figure 6 is a perspective view of the cloth plate and the female cutting member in disengaged position, and showing the key and keyway arrangement which permits longitudinal shifting bodily of the entire pinking attachment.

Figure 1 shows my pinking attachment 10 mounted on the base or base plate 39 of a sewing machine 40, and is rigidly attached thereto by means of a bolt 41 passing through an elongated aperture 42 in the base 11 of my attachment 10. It will also be noted that the cloth plate 43 of the sewing machine 40 has been cut away so as to provide two parallel longitudinal inner guide surfaces 44, 44, forming a keyway. It will also be noted that the width of the female cutting member 25, best shown in Figure 6, has been made equal to the spacing between the parallel guide surfaces 44, 44, and forming a key, and that by unscrewing the bolt 41 it is possible to slide the entire pinking attachment 10 longitudinally and thus vary the distance between the stitch line formed by the needle 45 and the ornamented edge formed by the pinking cutting members 22 and 25.

It is also to be noted that the lower face 46 of the base 11 is in the same plane as the cloth plate 43 of the sewing machine 40, and that the female cutting member 25 is fastened against the lower face of the base 11, and thus making it possible to grind and renew the working face of the female cutting member indefinitely as it always returns to the original level of the cloth plate after grinding. The importance of maintaining the female cutting member 25 and the cloth plate 43 in a constant level plane, as provided by the structure thus described, arises from the fact that if there were any irregularity in the operating surfaces of the feeding mechanism, the material operated on would not feed properly and this would interfere with the operator of the sewing machine.

Referring to Figure 1, it will be noted that I have provided a guide member 47, attached to and positioned in front of the presser foot 48 of the sewing machine 40, and which serves to keep the fingers of the sewing machine operator away from the movable male cutting member 22.

Referring to Figure 2, it will be seen that the actuating mechanism for the cutter arm 13 of my pinking attachment 10, comprises the main drive shaft 49 of the sewing machine and a gear 50 mounted thereon. Mounted in parallel relation to the drive shaft 49 is a stationary shaft 51, housed in a bracket member 52. Rotatably mounted on shaft 51 and in engagement with the gear 50 is a larger gear 53, which rotates at a lower speed than the speed of the gear 50. Fastened to and in eccentric relation with the gear 53 is a roller 54, which contacts with the roller 34, mounted on the cutter arm 13, and this eccentric roller actuates my pinking attachment. As previously mentioned, my pinking attachment is adapted for longitudinal adjustment and for this purpose I have found it necessary to make the eccentric roller 54 much wider than the roller 34 on the cutter arm 13, in order that there shall be at all adjustments a roller surface in contact with the roller or power actuating means 34.

Figure 5:
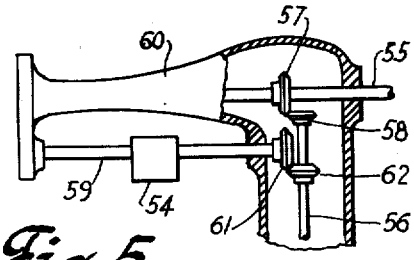
Figure 5 is a fragmentary portion of a sewing machine and shows a modified form of mechanism for actuating the cutter arm.

Referring to Figure 5, it will be noted that there has been provided a modified form of mechanism for actuating the cutter arm of my pinking attachment. The numeral 55 represents the main drive shaft of the sewing machine, the power being transmitted by means of bevel gears 57, 58. It will be noted that I have provided a similar drive for the eccentric roller 54. In this mechanism the eccentric roller is mounted on a shaft 59 positioned below and in parallel relation with the main drive shaft 55 of the sewing machine 60. At the end of the shaft 59 where it enters the driving end of the sewing machine, I have mounted a bevel gear 61, in engagement with a smaller size bevel gear 62, mounted on the upright shaft 56. It is readily apparent that the rotation of the main drive shaft 55 will cause the bevel gear 62 to drive the bevel gear 61, and thus cause the eccentric roller 54 to revolve, and operate the pinking attachment shown in Figures 3 and 4.

Figure 4:
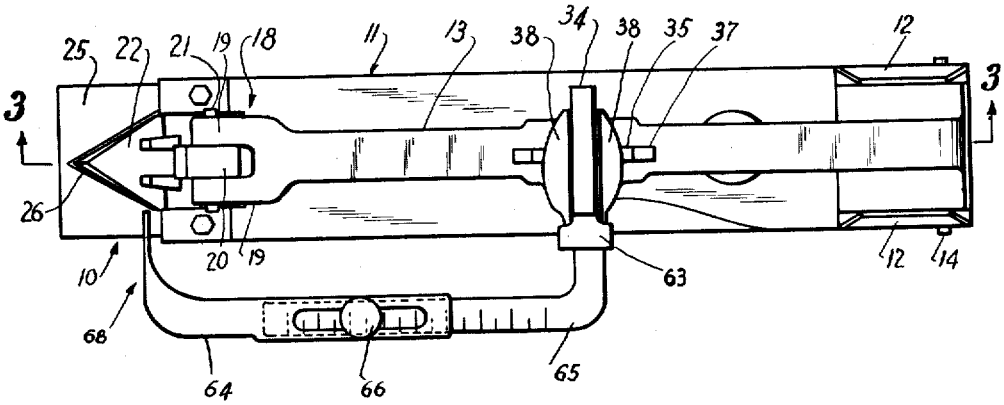
Fig. 4 is a plan view of the attachment.

Referring to Figures 1 and 4, it will be noted that I have provided a gauge 68 for guiding the edge of the fabric being pinked from the line of stitching made by the needle 45, said gauge comprising a member 64, adapted to slide relative to a stationary member 65, and adjustable longitudinally by means of a screw 66. The said gauge is secured to the base 11 of the pinking attachment 10 by means of a screw 67. The gauge 68 insures the spacing of the line of pinking from the line of stitching.

Referring to Figure 1, it will be apparent that the entire pinking attachment 10 may be quickly removed from the sewing machine base plate 30, by removing the bolt 41, and the sewing machine may then be operated exclusively for stitching purposes for which it was originally designed.

It will thus be seen that I have provided a very simple pinking attachment by means of which it is possible to convert any standard sewing machine into a combined stitching and pinking machine, which ornaments the edge of the fabric and prevents it from unraveling. It is obvious that when my pinking attachment is incorporated in a sewing machine, a large saving in time and labor is effected because the fabric may be stitched and pinked in one operation.

It is also to be noted that the recess in the cloth plate 43 permits the ledger blade means 25 to enter into position close to the needle and permits the ledger blade means to be mounted with its upper surface in the same plane as the upper surface of the cloth plate in all longitudinal adjustments from the stitching line to the pinking line which is of vital importance as it permits feeding the materials being pinked on a constant level plane on both the cloth plate and the ledger blade.

I claim:

1. A pinking attachment for sewing machines comprising a base, a female cutting member fastened to the lower surface of the base, a cutter arm pivotally mounted on said base, a male cutting member pivotally mounted on said arm and adapted to be swung in and out of engagement with said female cutting member, and resilient means fastened to said cutter arm and acting against said male cutting member and causing a frictional pressure between the cutting edges of the male and female cutting members.

2. A pinking attachment for sewing machines comprising a base, a female cutting member fastened to the lower surface of the base, a cutter arm pivotally mounted on said base, a male cutting member pivotally mounted on said arm and adapted to be swung in and out of engagement with said female cutting member, spring means causing a frictional pressure between the cutting edges of the male and female cutting members, and spring means associated with said base and reacting against said cutter arm for supporting said cutter arm in a raised position and holding said cutting members out of cutting engagement.

3. A pinking attachment for sewing machines comprising a base, female cutting member fastened to the lower surface of the base, a cutter arm pivotally mounted on said base, a male cutting member pivotally mounted on said arm and adapted to be swung in and out of engagement with said female cutting member, spring means causing a frictional pressure between the cutting edges of the male and female cutting members, adjustable means for regulating the pressure between the cutting edges of the male and female cutting members, and spring means associated with said base and reacting against said cutter arm for supporting said cutter arm in a raised position and holding said cutting members out of cutting engagement.

4. In combination with a sewing machine having stitching mechanism including a cloth plate, a pinking attachment having a base mounted on the base plate of the sewing machine, a female cutting member fastened to the lower surface of the pinking attachment base, said cloth plate being provided with an opening adapted to receive and space said female cutting member adjacent to the line of stitching, a male cutting member pivotally mounted on said pinking attachment base and adapted to be swung in and out of engagement with said female cutting member, adjustable spring means for causing a regulated pressure between the cutting edges of the male and female cutting members, spring means associated with said base and reacting against said male cutting member mounting for supporting said cutting member in a raised position and means actuated by the driving mechanism of the sewing machine for lowering said male cutting member.

5. In combination with a sewing machine having stitching mechanism including a cloth plate, a pinking attachment having a base mounted on the base plate of the sewing machine, a female cutting member fastened to the lower surface of the pinking attachment base, and cloth plate being provided with parallel longitudinal inner guide surfaces adapted to receive said female cutting member and guide said pinking attachment for longitudinal adjustment relative to the stitch line of said sewing machine.

6. In combination with a sewing machine having a shaft mounted below and parallel with the needle-bar operating shaft and driven by an upright shaft of said sewing machine, an elongated cylindrical roller mounted in eccentric relation on said lower shaft, a pinking attachment having a base mounted on the base plate of said sewing machine and having a cutter arm pivotally mounted on said pinking attachment base, said cutter arm having a roller adapted for engagement with and to be actuated by said eccentrically mounted roller.

7. The combination with a sewing machine including a work support, an overhanging arm, a vertically reciprocatory needle mounted in the free end of the overhanging arm, and a main shaft journaled in the overhanging arm for reciprocating the needle; and a pinking attachment including a base, a ledger blade rigidly connected to the base and having a V-shaped opening, vertically reciprocatory trimmer means mounted on the base for cooperation with the ledger blade opening, operating connections between the vertically reciprocatory trimmer means and the main shaft, the attachment being located on the work support below the overhanging arm with the blades adjacent the needle, and means for adjustably mounting said attachment on the work support for straight line movements towards and from the needle and maintaining the operating connections effective in any position of adjustment.

8. The combination with a sewing machine including a work support, an overhanging arm, a vertically reciprocatory needle mounted in the free end of the overhanging arm, said work support being provided with an opening under the overhanging arm and at the side of the needle, and a main shaft journaled in the overhanging arm for reciprocating the needle; and a pinking attachment including a base, a ledger blade disposed below the plane of the base and being rigidly connected to one end thereof and having a V-shaped opening, vertically reciprocatory trimmer means mounted on the base for cooperation with the ledger blade opening, operating connections between the vertically reciprocatory trimmer means and the main shaft, the attachment being located on the work support below the overhanging arm with the blades adjacent the needle, and with the ledger blade disposed within the opening of the work support and having its upper face in substantially the same plane as the upper face of the work support, and means for adjustably mounting said attachment on the work support for straight line movements towards and from the needle and maintaining the operating connections effective in any position of adjustment.

MAX POPPER.